(12) United States Patent
Boutboul et al.

(10) Patent No.: US 7,631,098 B2
(45) Date of Patent: Dec. 8, 2009

(54) METHOD, SYSTEM AND PROGRAM PRODUCT FOR OPTIMIZED CONCURRENT DATA DOWNLOAD WITHIN A GRID COMPUTING ENVIRONMENT

(75) Inventors: Irwin Boutboul, White Plains, NY (US); David E. Martin, Chicago, IL (US); Dikran S. Meliksetian, Danbury, CT (US); Nianjun Zhou, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 10/862,977

(22) Filed: Jun. 8, 2004

(65) Prior Publication Data

US 2006/0031537 A1 Feb. 9, 2006

(51) Int. Cl.
*G06F 15/173* (2006.01)
(52) U.S. Cl. .................. 709/238; 709/203; 709/224
(58) Field of Classification Search ......... 709/229–231, 709/238, 220–224, 203; 726/29; 707/10; 705/59
See application file for complete search history.

(56) References Cited

U.S. PATENT DOCUMENTS

| | | | |
|---|---|---|---|
| 6,003,045 A | 12/1999 | Freitas et al. | |
| 6,061,720 A * | 5/2000 | Kamel et al. | 709/219 |
| 6,170,016 B1 * | 1/2001 | Nakai et al. | 709/232 |
| 6,339,785 B1 * | 1/2002 | Feigenbaum | 709/213 |
| 6,381,709 B1 | 4/2002 | Casagrande et al. | 714/18 |
| 6,407,752 B1 | 6/2002 | Harnett | 345/744 |
| 6,477,522 B1 * | 11/2002 | Young | 707/2 |
| 6,606,646 B2 * | 8/2003 | Feigenbaum | 709/203 |
| 6,678,733 B1 * | 1/2004 | Brown et al. | 709/229 |
| 6,742,023 B1 * | 5/2004 | Fanning et al. | 709/219 |
| 6,772,217 B1 * | 8/2004 | Baumann et al. | 709/232 |
| 6,920,110 B2 * | 7/2005 | Roberts et al. | 370/235 |
| 6,961,858 B2 * | 11/2005 | Fransdonk | 726/29 |
| 7,047,309 B2 * | 5/2006 | Baumann et al. | 709/232 |

(Continued)

FOREIGN PATENT DOCUMENTS

JP  2002268979  9/2002

(Continued)

OTHER PUBLICATIONS

Cory Higgins and Ciaran Tannam, Slyck's Guide to BitTorrent, May 18, 2003.*

(Continued)

*Primary Examiner*—Saleh Najjar
*Assistant Examiner*—Waseem Ashraf
(74) *Attorney, Agent, or Firm*—John E. Campbell

(57) ABSTRACT

In a Grid computer system having a plurality of download servers in network communication with client computers and a download management system, a client requests a download plan from the download management system for downloading data in parallel from the plurality of download servers to a client. The client requests chunks of data from download servers identified by the download plan. The client monitors the performance of the download servers downloading the chunks and reassigns portions of chunks amongst the download servers in order to improve the performance of completing the download of the chunks. A chunk of download data is a plurality of files, a file or a portion of file of data.

40 Claims, 10 Drawing Sheets

U.S. PATENT DOCUMENTS

| | | | |
|---|---|---|---|
| 7,272,613 B2 * | 9/2007 | Sim et al. | 707/102 |
| 7,277,938 B2 * | 10/2007 | Duimovich et al. | 709/224 |
| 7,324,228 B2 * | 1/2008 | Chiarabini et al. | 358/1.15 |
| 2002/0039196 A1 * | 4/2002 | Chiarabini et al. | 358/1.15 |
| 2002/0099844 A1 * | 7/2002 | Baumann et al. | 709/232 |
| 2002/0107968 A1 * | 8/2002 | Horn et al. | 709/230 |
| 2003/0051059 A1 | 3/2003 | Zondervan et al. | 709/250 |
| 2003/0074465 A1 | 4/2003 | Tang et al. | 709/237 |
| 2003/0084123 A1 | 5/2003 | Kamel | 709/219 |
| 2003/0084280 A1 | 5/2003 | Bryan et al. | 713/153 |
| 2003/0101446 A1 | 5/2003 | McManus et al. | 717/178 |
| 2004/0172476 A1 * | 9/2004 | Chapweske | 709/231 |
| 2005/0015511 A1 * | 1/2005 | Izmailov et al. | 709/238 |
| 2005/0033856 A1 * | 2/2005 | Li | 709/231 |
| 2006/0064383 A1 * | 3/2006 | Marking | 705/57 |
| 2006/0064386 A1 * | 3/2006 | Marking | 705/59 |
| 2007/0150481 A1 * | 6/2007 | Song et al. | 707/10 |

FOREIGN PATENT DOCUMENTS

| | | |
|---|---|---|
| JP | 2003067280 | 3/2003 |
| JP | 2003337803 | 11/2003 |

OTHER PUBLICATIONS

"Grid Computing Distribution Using Network Processors", Liljeqvist et al., Chalmers University of Technology, Sweden.

"The Physiology of the Grid—An Open Grid Services Architecture for Distributed Systems Integration", Foster et al; published on the world wide web at: www.globus.org/research/papers/ogsa.pdf.

International Search Report PCT1 POU040057 Mailing Date Sep. 8, 2005 International Filing Date Jul. 6, 2005 PCT/EP2005/052600 11 pages.

"Grid Computing Distribution Using Network Processors", Liljeqvist et al., Chalmers University of Technology, Sweden Nov. 4, 2002.

"The Physiology of the Grid - An Open Grid Services Architecture for Distributed Systems Integration", Foster et al; published on the world wide web at: www.globus.org/research/papers/ogsa.pdf Jun. 22, 2002.

* cited by examiner

US 7,631,098 B2

METHOD, SYSTEM AND PROGRAM PRODUCT FOR OPTIMIZED CONCURRENT DATA DOWNLOAD WITHIN A GRID COMPUTING ENVIRONMENT

FIELD OF THE INVENTION

The present invention is related to computer data handling. It is more particularly related to downloading data in a Grid computing environment.

BACKGROUND OF THE INVENTION

Grid computing is the virtualization of distributed computing resources such as processing power, networks bandwidth and storage capacity to create a single system image, granting users and applications seamless access to vast IT capabilities. A source for more information about Grid computing is found in "The Physiology of the Grid—an open grid services architecture for distributed systems integration" by Foster, Kesselman, Nick and Tuecke published on the world wide web at: "www.globus.org/research/papers/ogsa.pdf which paper is incorporated herein by reference.

A paper "Grid Computing Distribution Using Network Processors" by Llevist and Bengsson, Chalmers University of Technology discusses grid computing. The paper focuses on a proposal of a new computing model that distribute both the code and data to nodes of network (grid), the routers of the network will determine which nodes should be selected to execute the code based on the knowledge collected by the routers.

In a patent "Multi-Server File Download"—U.S. Pat. No. 6,339,785 B1 (Feigenbaum) incorporated herein by reference, when download speed from a server falls below pre-defined expected rate, Feigenbaum removes the server. When a server is finished its portion of data chunk Feigenbaum does not use it anymore if not necessary (if all other servers are above a pre-defined expected rate). Significantly in the Feigenbaum patent, there are situations where 2 servers are ranked 10 k/s. Then download begins with two identical chunks. The first server does 10 k/s, so it complies with expected speed. The second server does 1000 k/s (because network is dynamic . . . ) and finished it s chunk right away. Feigenbaum will keep the first chunk at 10 k/s until finished . . . ("SHOULD THE PERFORMANCE OF THE SERVER FALL BELOW A PREDEFINED LEVEL, THE LINK IS DISCONTINUED"). There is no method to reassign the 10 k/s chunk to the 1000 k/s server and we go on with this process.

There is a need for intelligently downloading data from servers in a grid network.

SUMMARY OF THE INVENTION

Grid computing is the virtualization of distributed computing resources such as processing power, networks bandwidth and storage capacity to create a single system image, granting users and applications seamless access to vast IT capabilities. In this disclosure, we describe a download service within a grid computing environment.

Rather than using traditional/client server or peer-to-peer models, this invention uses the model of service providers, consumers and brokers. The broker has the responsibility of providing the roadmap of the service, securing the applications and maintaining records. The consumer can contact the service providers and receive service from them only after obtaining the necessary authorization and credentials from the broker. Moreover, the broker may direct the consumer to receive service from multiple service providers concurrently. In the context of the download grid, the broker is implemented as a management service, the service producers are implemented as download servers and the consumers are implemented as client agents. The agents initiate and process file downloads on behalf of end users. This model can be applied to a variety of grid applications.

The primary objective of this invention is to provide a high throughput download service while efficiently managing network resources and controlling access to the distributed assets.

It is another object of this invention to provide multiple concurrent data streams to support parallel data transfer (download) from multiple servers based on an optimized plan. The optimization is preferably based on 1) the network access point of the service request node (or client); 2) the topology of the servers, 3) the network traffic of the moment of requesting the service; and 4) the service level contract for a client.

It is another object of this invention to use an X.509 proxy to encapsulate both the credential and optimized plan.

It is yet another object of this invention to, knowing the maximum allowed bandwidth for the client; calculate the initial number of servers serving the client. The number of servers is adjustable to reach the maximum performance of the replication process.

It is another object of this invention to, wherein prior knowledge of the maximum allowed bandwidth for the client is not available, the initial number of servers will start from one, and the system will adjust to find the number of servers to reach the maximum replication speed.

It is another object of this invention to provide feedback of the replication process to allow better quality of optimization plan.

It is another object of this invention to, using the feedback system and grid computing infrastructure, de-activate services from the grid and re-activate on-demand.

It is another object of this invention to, for a given piece of data (or file), based on the distribution of the access points of the service request, optimize the distribution of the servers over the network topology to reduce the wide-area traffic or optimize other criteria.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DESCRIPTION OF THE PREFERED EMBODIMENTS

The present invention provides a download service within a grid computing environment. Rather than using traditional/client server or peer-to-peer models, this invention uses the model of service providers, consumers and brokers. The broker has the responsibility of providing the roadmap of the service, securing the applications and maintaining records. The consumer can contact the service providers and receive service from them only after obtaining the necessary authorization and credentials from the broker. Moreover, the broker may direct the consumer to receive service from multiple service providers concurrently. In the context of the download grid, the broker is implemented as a management service, the service producers are implemented as download servers and the consumers are implemented as client agents. The agents initiate and process file downloads on behalf of end users. This model can be applied to a variety of grid applications.

The download grid needs to be scalable, reliable, secure, adaptable and efficient:

Scalability: The present invention should utilize any set of resources that belongs to a grid. The download grid uses a dynamic set of download servers. Therefore, the present invention is scalable.

Reliability: Rather than relying on a single server, the download grid has many servers. A failure of an individual server will not disable the download service. Therefore, the present invention is reliable.

Security: The present invention uses a private key infrastructure (PKI) and X.509 certificates as the security infrastructure. Therefore it is secure.

Adaptability: The download grid can dynamically allocate portions of a file to be downloaded from multiple servers concurrently. The present invention is adaptable as the allocation is based on the perceived performance of each particular server.

Efficiency: The management service controls which subset of resources can be utilized for a particular download. It performs this selection with the objective of minimizing the overall usage of the network resources (bandwidth usage). Therefore the present invention is efficient.

The primary objective of this invention is to provide a high throughput download service while efficiently managing network resources and controlling access to the distributed assets.

Figure 1:
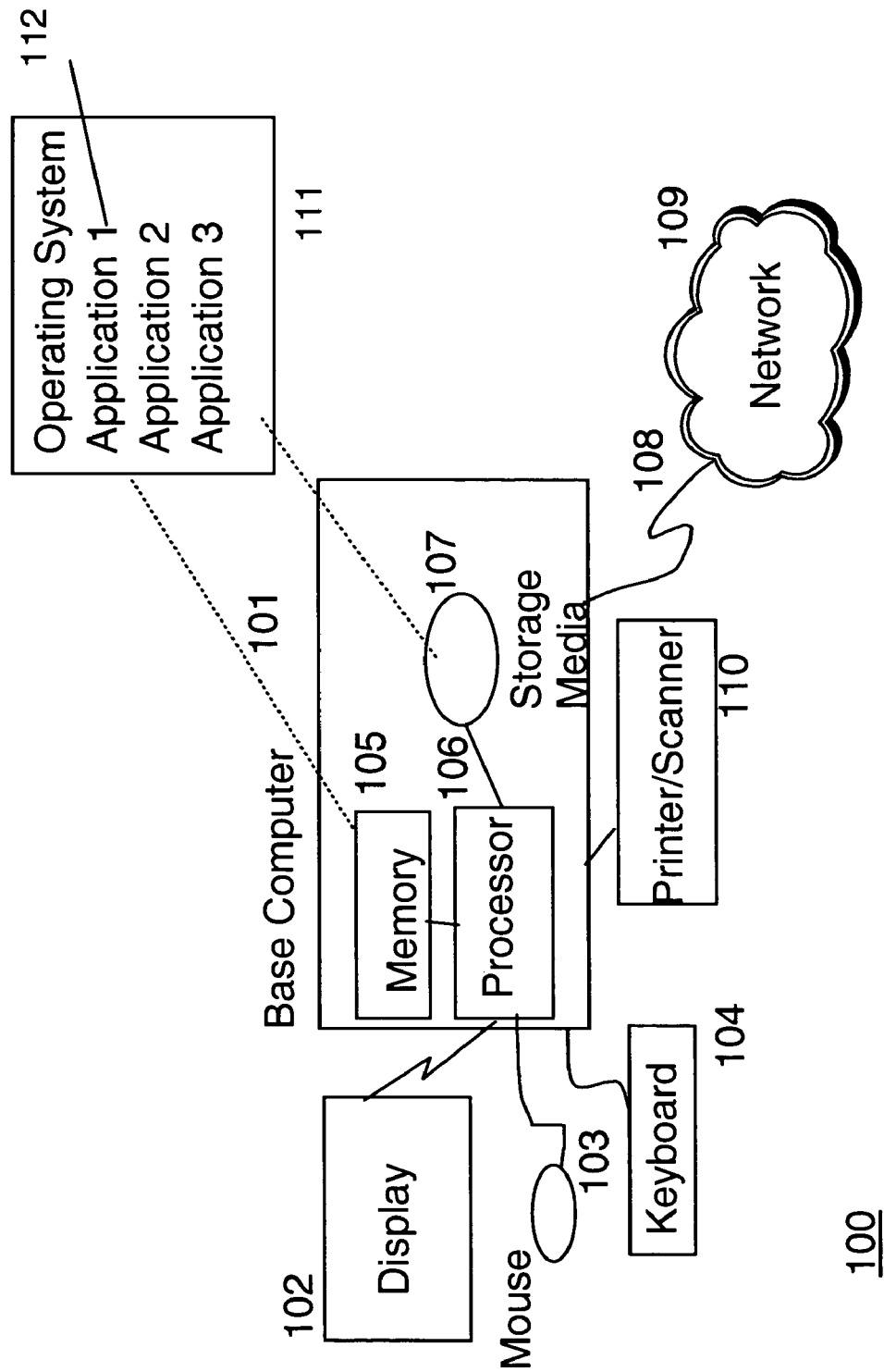
FIG. 1 is a depiction of components of a computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
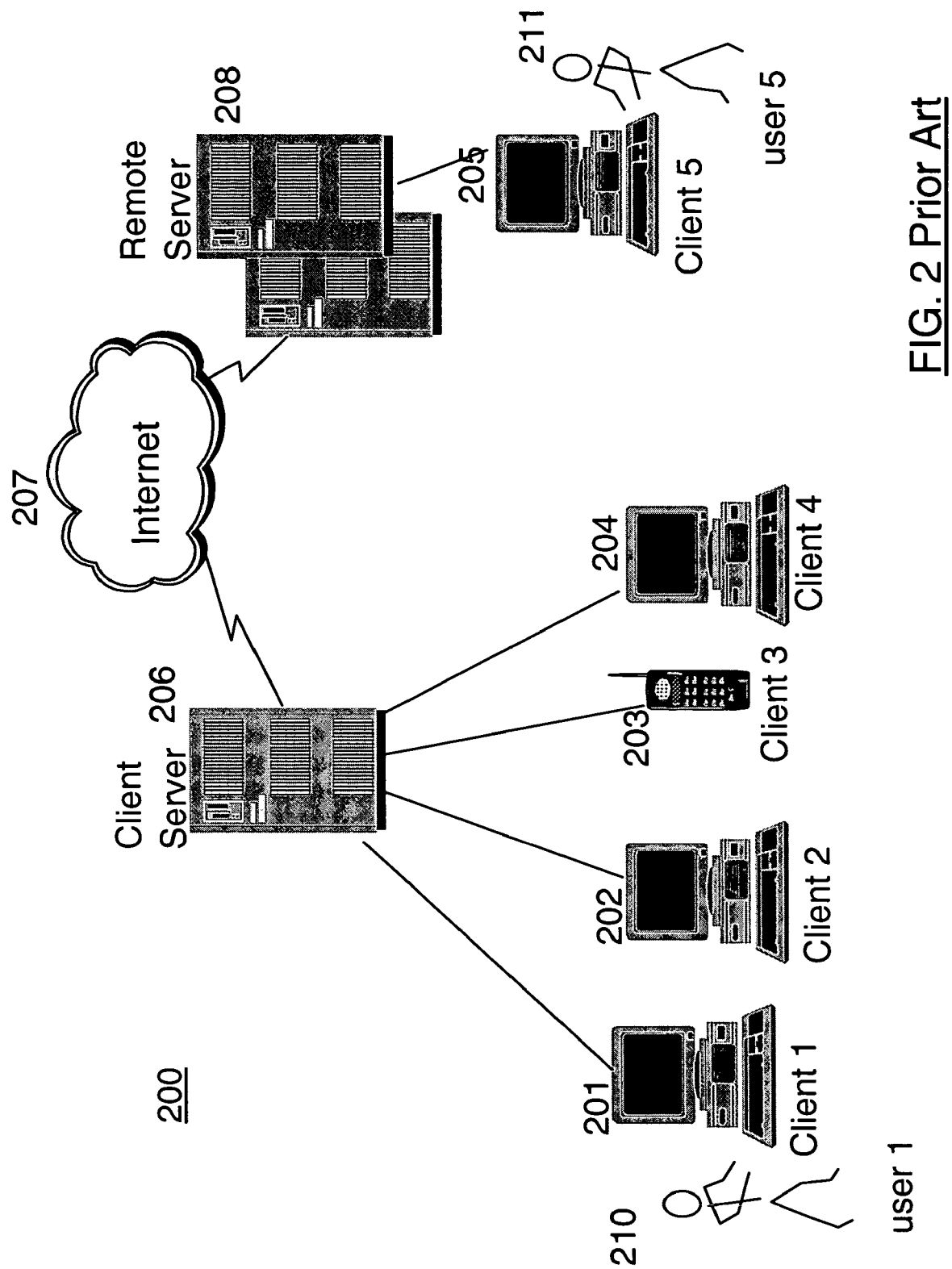
FIG. 2 is a depiction of a prior art Client/Server network.

FIG. 2 illustrates a data processing network 200 in which the present invention may be practiced. The data processing network 200 may include a plurality of individual networks, such as a wireless network and a wired network, each of which may include a plurality of individual workstations 101. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 using a communications link. The gateway computer may be implemented utilizing an IBM eServer zServer 900 Server available from IBM.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

In the preferred embodiment, the present invention is implemented as one or more computer software programs 111. The implementation of the software of the present invention may operate on a user's workstation, as one or more modules or applications 111 (also referred to as code subroutines, or "objects" in object-oriented programming) which are invoked upon request. Alternatively, the software may operate on a server in a network, or in any device capable of executing the program code implementing the present invention. The logic implementing this invention may be integrated within the code of an application program, or it may be implemented as one or more separate utility modules which are invoked by that application, without deviating from the inventive concepts disclosed herein. The application 111 may be executing in a Web environment, where a Web server provides services in response to requests from a client connected through the Internet. In another embodiment, the application may be executing in a corporate intranet or extranet, or in any other network environment. Configurations for the environment include a client/server network, Peer-to-Peer networks (wherein clients interact directly by performing both client and server function) as well as a multi-tier environment. These environments and configurations are well known in the art.

Figure 3:
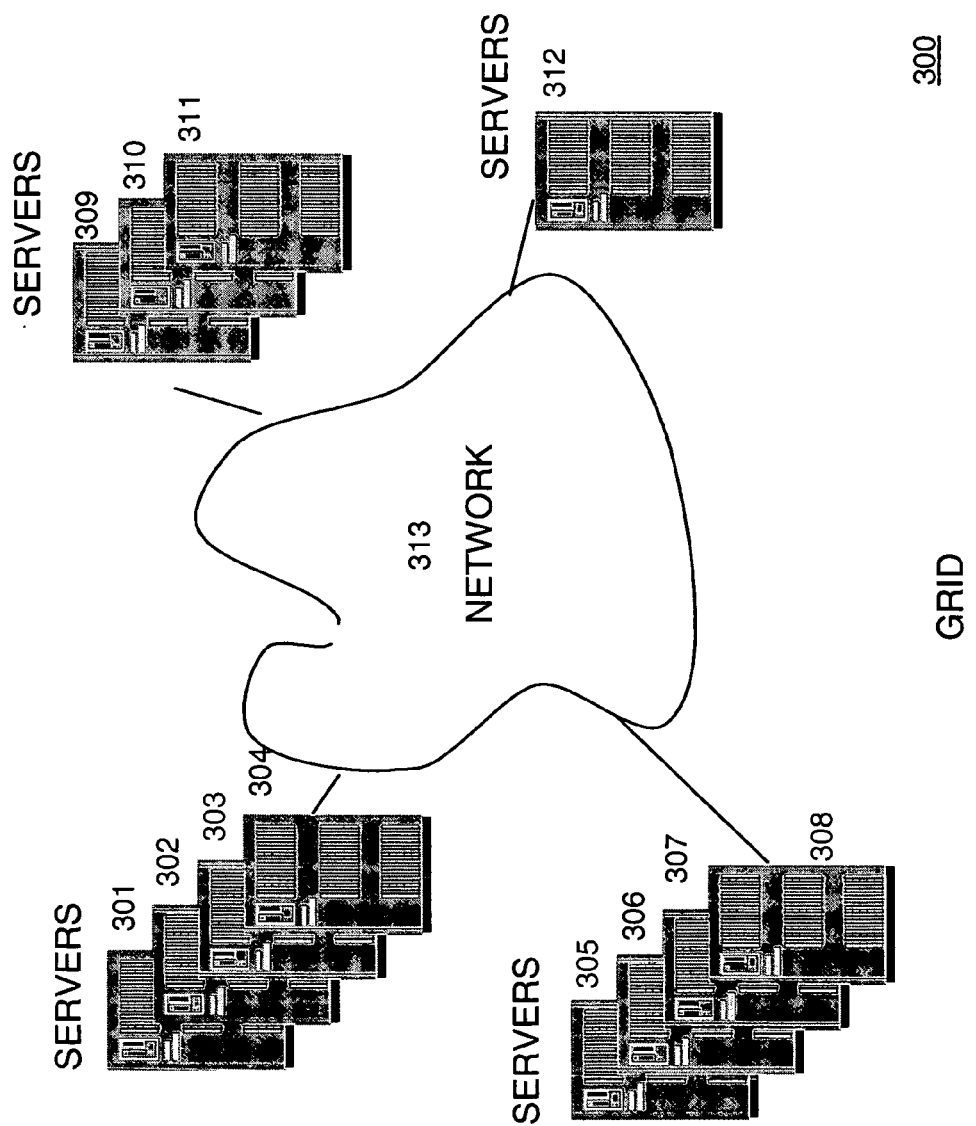
FIG. 3 is a depiction of a prior art Grid network.

FIG. 3 shows a high level representation of a prior art grid structure of Servers 301-312 communicating via a network fabric 313. Server 309 is connected with servers 310 and 311 by a local network. Server 308 provides Grid Broker services. The Grid Broker is discussed in "Grid Service Broker A Grid Scheduler for Computational and Data Grids" at www.gridbus.org/broker and in "A Grid service for Scheduling Distributed Data-Oriented Appellations on local Grids" at www.gridbus.org/papers/g.PDF.

Figure 4:
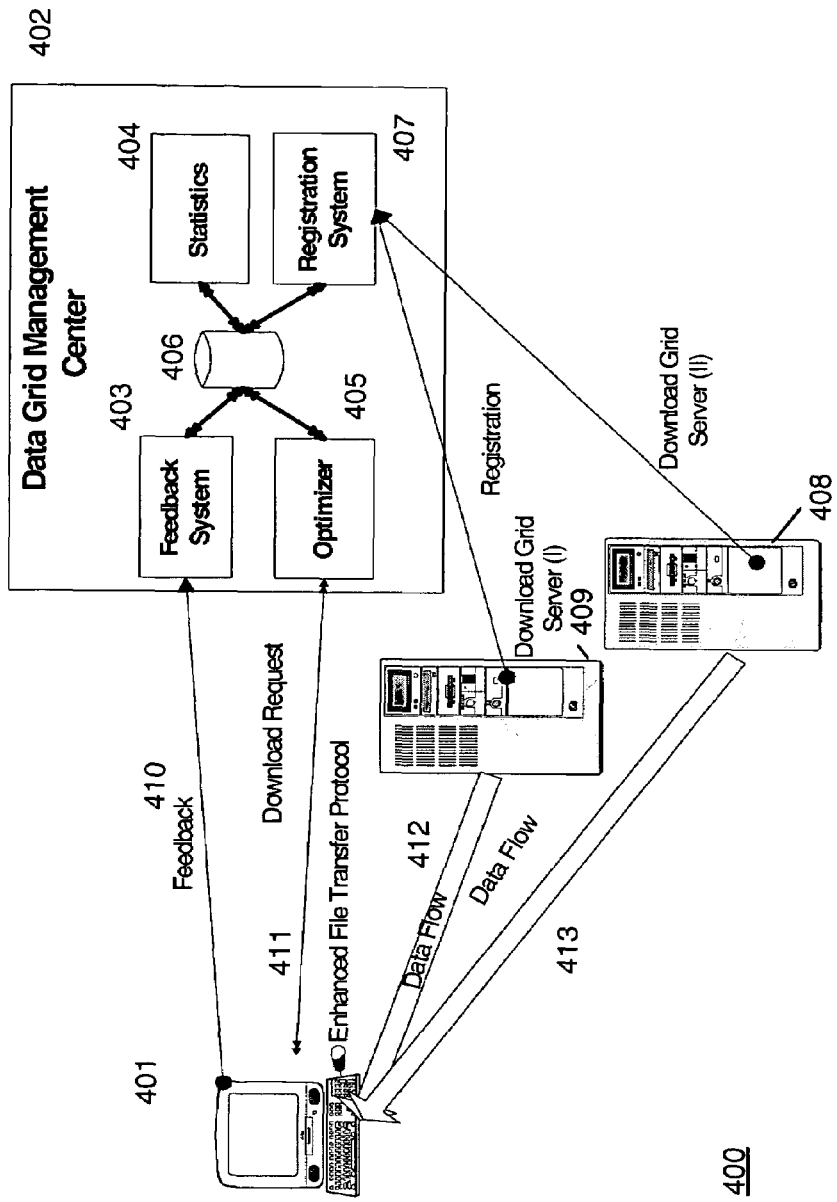
FIG. 4 is an example high level download grid architecture diagram.

FIG. 4 depicts the high-level architecture of the download grid system. The management service 402 preferably contains four modules and a repository database 406. There are a number of servers represented by 408 and 409 in the grid system, which are registered at the management service center 402. Furthermore, all the files allowed to be downloaded are registered at the management center. The functions of the four modules are:

Optimizer 405—determines the optimized download plan (comprising an optimized list of servers) and provides it to the client;

Registration System 407—provides a registry of servers and files;

Feedback System 403—collects feedback from clients 401 about the servers status and performance; and Statistics System 404—analyzes the application usage information from the feedback system and provides reports.

Figure 5:
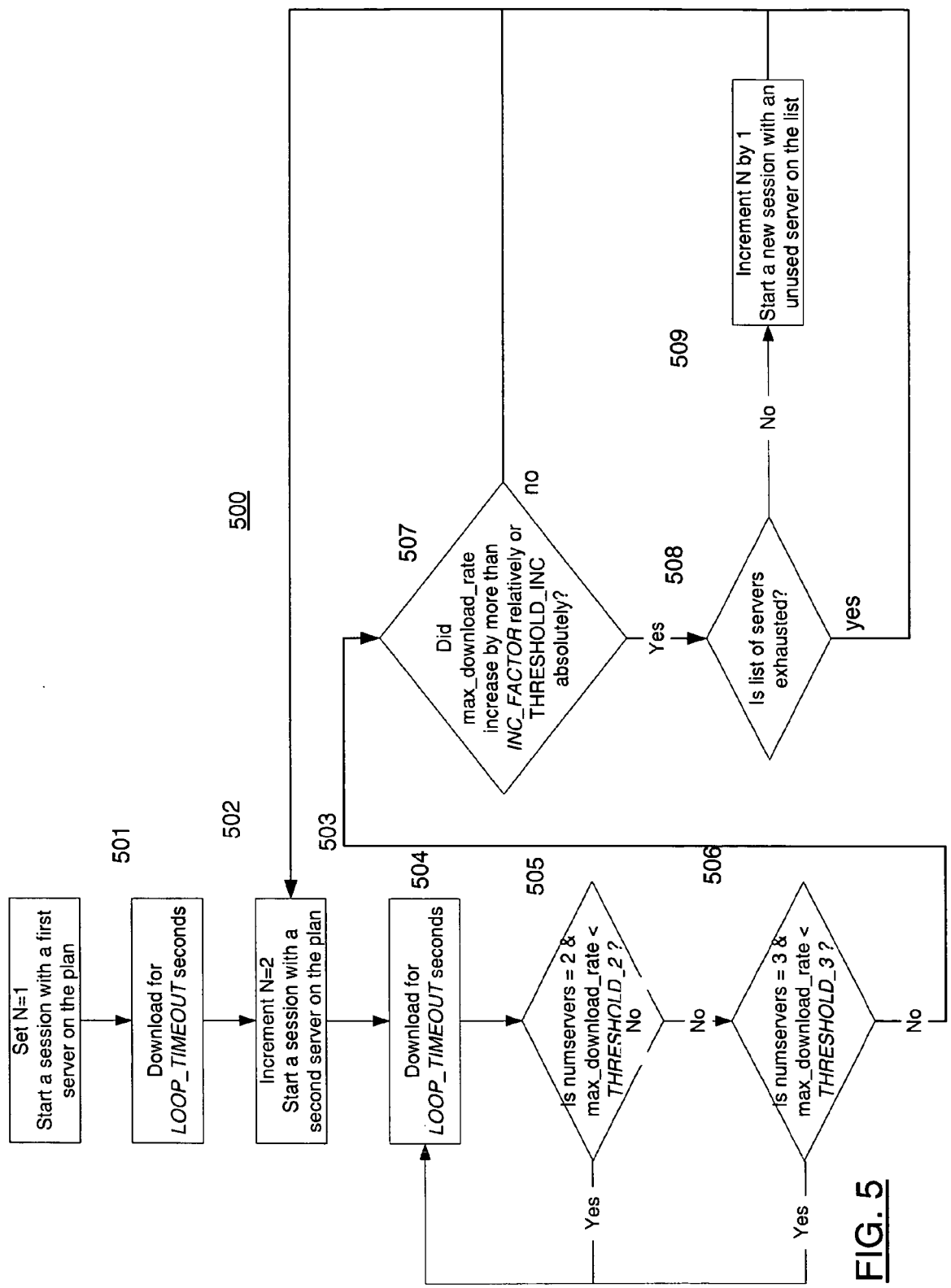
FIG. 5 is a flowchart example of a process that controls the number of concurrent download sessions.

FIG. 5 shows a preferred process that the client uses to determine the number of sessions that it will use to download a chunk in parallel from a plurality of download servers. The client first initiates a session 501 with one of the servers in the optimized list. It will continually monitor the download rate for each portion of the chunk from respective server. It will analyze the monitored rate every LOOP_TIMOUT seconds.

At the end of the first LOOP_TIMEOUT period 502, it will start a second session 503 with one of the unused servers on the list if the QoS (Quality of Service) requirement is not met.

In subsequent iterations, it will proceed as follows:

if (N=2 505 or N=3 506) it will try to begin an $(N+1)^{th}$ session with another server if the maximum download rate (max_download_rate) achieved with the current number of session is superior to a predefined threshold (THRESHOLD_{N}).

Otherwise, if N>3, it will check both the relative and absolute gains obtained from the last addition and act accordingly. If (507):

MAX_RATE(N servers)−MAX_RATE (N−1 servers)>THRESHOLD_INC or (MAX_RATE(N servers)−MAX_RATE (N−1 servers))/MAX_RATE (N−1 servers)>INC_FACTOR where MAX_RATE(N servers) is the maximum download rate achieved with N sessions, MAX_RATE(N−1 servers) is the maximum rate achieved with N−1 servers; THRESHOLD_INC and INC_FACTOR are predefined absolute and relative thresholds respectively. It will begin an $(N+1)^{th}$ session with another server 509.

The initial THRESHOLD_N limit is an adjustment to avoid too many sessions with low download rates. In an example implementation the values of the various parameters are as follows:

THRESHOLD_2=40 k byte/s
THRESHOLD_3=75 k byte/s
INC_FACTOR=20%
THRESHOLD_INC=30 k byte/s
LOOP_TIMEOUT=0.150 seconds A number of variations of this scheme are possible. For example, a bundle comprising two files is to be downloaded from the servers to a client, each server having both files. Download of portions of one file are started from a first group of servers and portions of a second file are started from a second group. When a server of the first group has finished downloading its portion, the client can elect to start a download of a portion of the one file or the second file on that server.

For another example, instead of randomly selecting the servers at each step, they can be selected in an order specified by the management service. Likewise, instead of starting with a single server, it is possible to start with multiple servers. Similarly, instead of treating the cases of N=2 and N=3 differently, it is possible to treat more or fewer N's differently. Still another variation would be to make INC_FACTOR dependent on N itself. These are just examples of the possible variations of these scheme, and do not represent an exhaustive list. Other variations known in the art could be used within the scope of this invention.

Figure 6A:
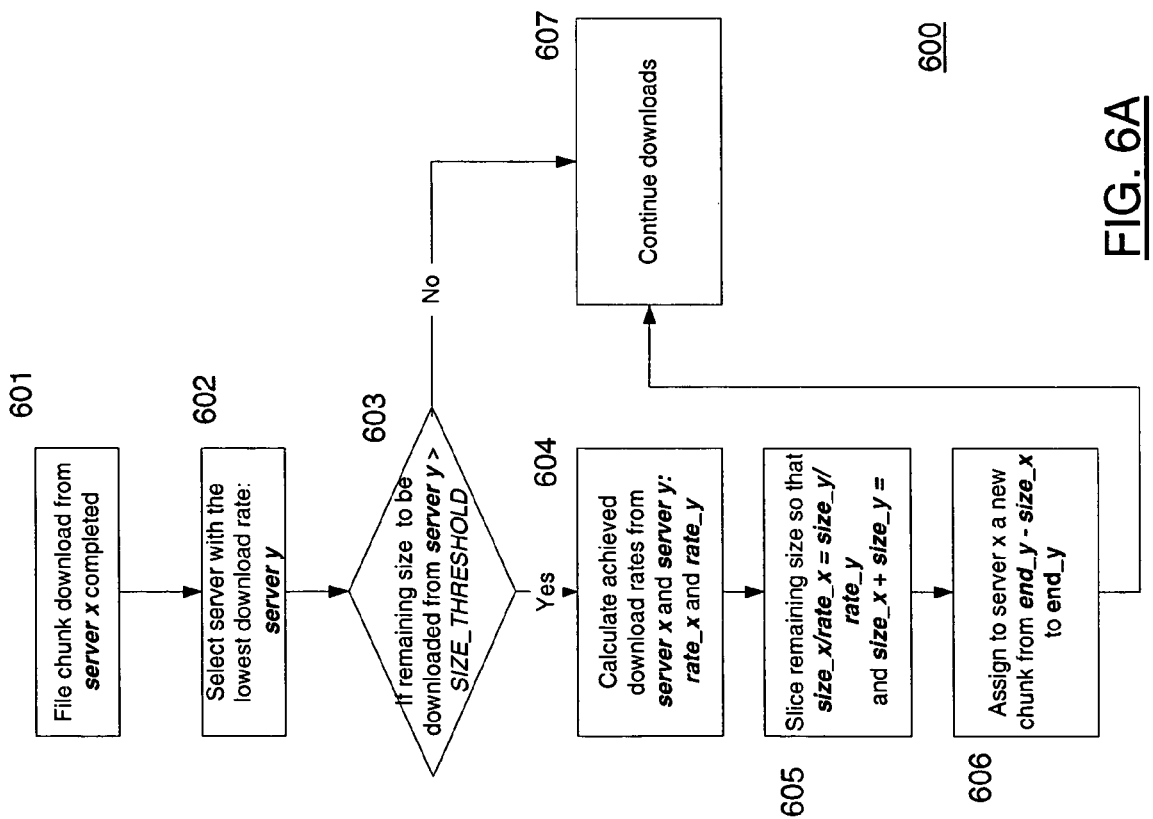
FIG. 6A is a flowchart example of a process of download readjustments.

FIG. 6A details the adjustments that occur during download. Chunks are assigned to different servers when a new download is initiated. A chunk is a portion or a totality of a file assigned to be downloaded from a particular server. In case, the download request is for a group of multiple files, a chunk might correspond to an entire file in the group. Each chunk's size depends on the attributed server speed listed in the optimized plan. Since network is dynamic, some chunks are completed earlier than expected. FIG. 6A depicts the chunk reassignment algorithm.

Figure 6B:
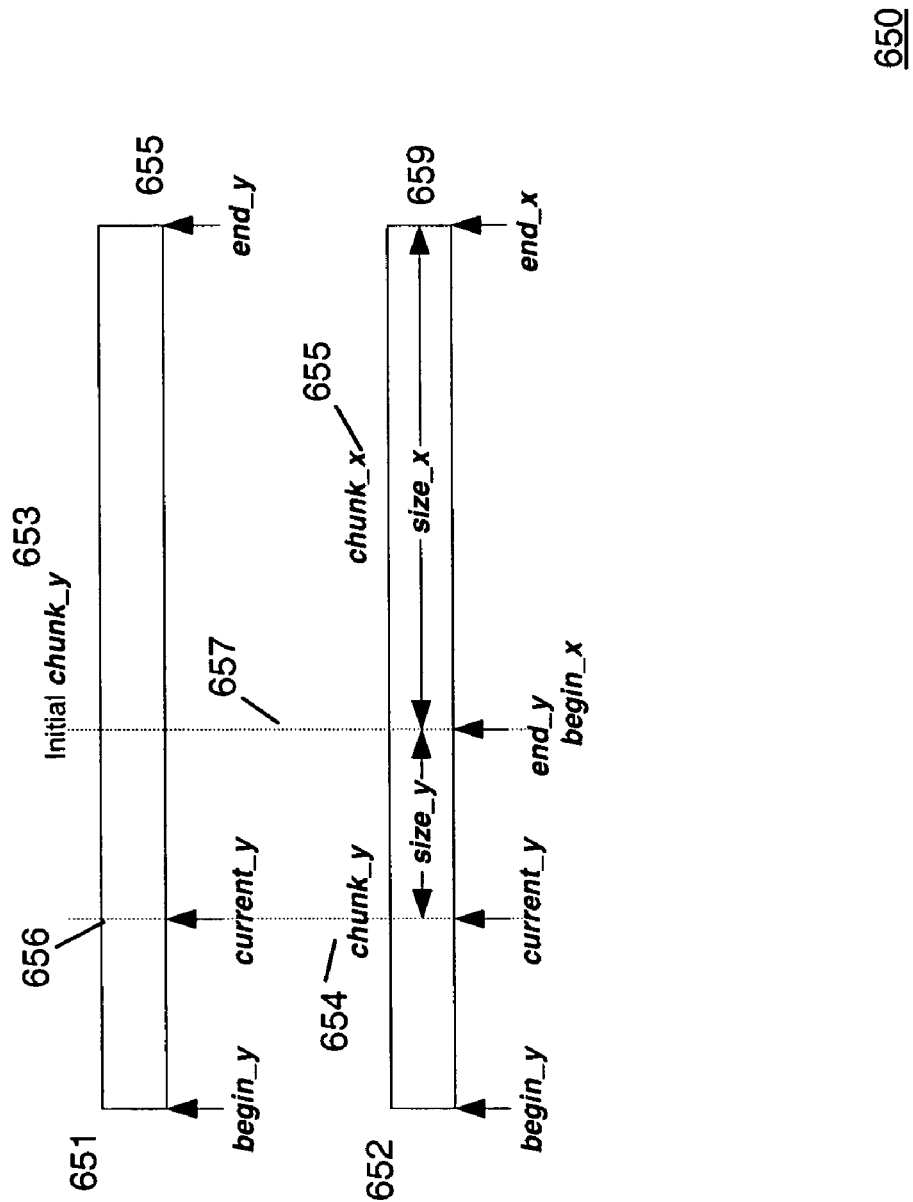
FIG. 6B is a graphical depiction of an example chunk reassignment process.

When server X completes its chunk 601, the client will check each active download, and will calculate the expected remaining time for each based on the remaining size of the chunk and it's current download rate. It will then select the chunk which has potentially the longest time to complete, from server Y (602). The selected chunk is represented as 653 in FIG. 6B. If the size of the selected chunk 653 is smaller than a pre-specified threshold (603), no further action will be taken. Otherwise (604), it will determine the acheived download rates of server X and server Y. It will divide (step 605) the remaining size of the chunk by an adjustment factor that takes into account the actual speed of server X and server Y and other parameters, so that downloads from both server X and server Y will finish at the same time. The corresponding chunks are represented by 654 and 655 on FIG. 6B. In other words, server X will finish the new chunk 655 (begin_x-end_x) at the same time that server Y finishes the chunk 654 (end_y). It will then (606) start downloading chunk 655 from Server X, while server Y completes the download of the chunk up to 657.

Parameters, other than rate, are also considered for determining the relative size of the chunks. These parameters can include such factors as session establishment time, and the remaining chunk sizes. The chunking algorithm will preferably avoid reassigning too small chunks when it does not make sense.

There are many variations on this algorithm. This is just an example implementation to teach the invention.

Figure 7:
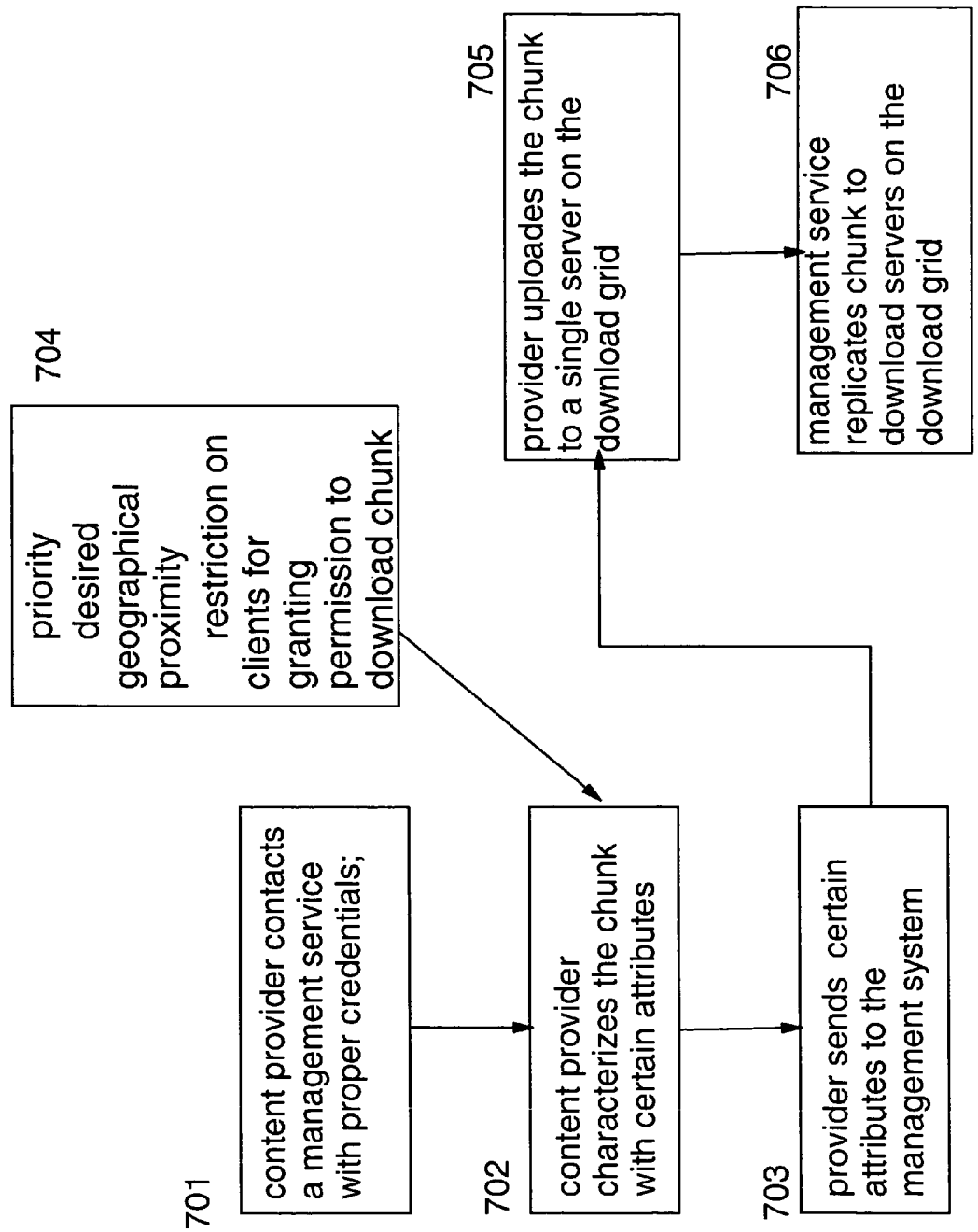
FIG. 7 is a flowchart of providing content to a Grid download system according to the invention.

In a preferred embodiment (FIG. 7) a file provider contacts a management service with proper credentials 701, the file provider characterizes 702 a chunk of download data with certain attributes 704, the file provider sends 703 the certain attributes 704 to the management system and uploads 705 the chunk to a single server on the download grid. The attributes 704 include any one of a priority, a desired geographical proximity for the file or a restriction on clients for granting permission to download the file. The file provider generates a decryption key, encrypts the file and securely sends the decryption key to the management service.

Figure 9:
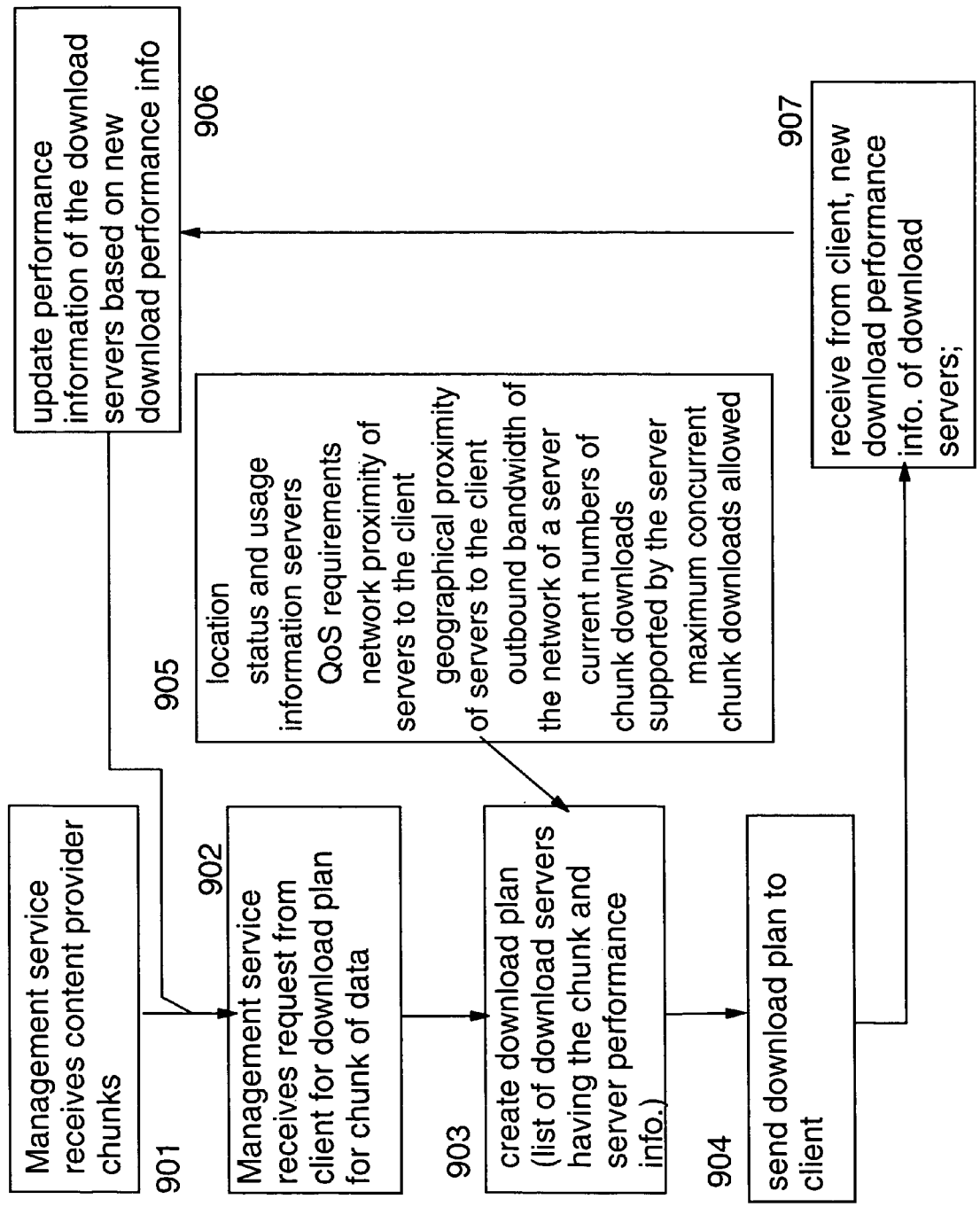
FIG. 9 is a flowchart of initiating a Grid download according to the invention.

The management service accepts download data from the content provider (FIG. 9) 901, distributes 706 the download data into an infrastructure, the infrastructure comprising a plurality of download servers. When the management service receives a request 902 from a client for a download plan for downloading the download data to the client (the request specifying QoS requirements, the QoS requirements include the specification of the download rate or the desired time of completion of the download), it creates 903 a download plan, the download plan comprising a list of two or more download servers having the download data and further comprising performance information 905 of the two or more download servers, then sends 904 the download plan to the client. (The download plan comprises an optimized list of a plurality of download servers deployed in a grid infrastructure.

Figure 8:
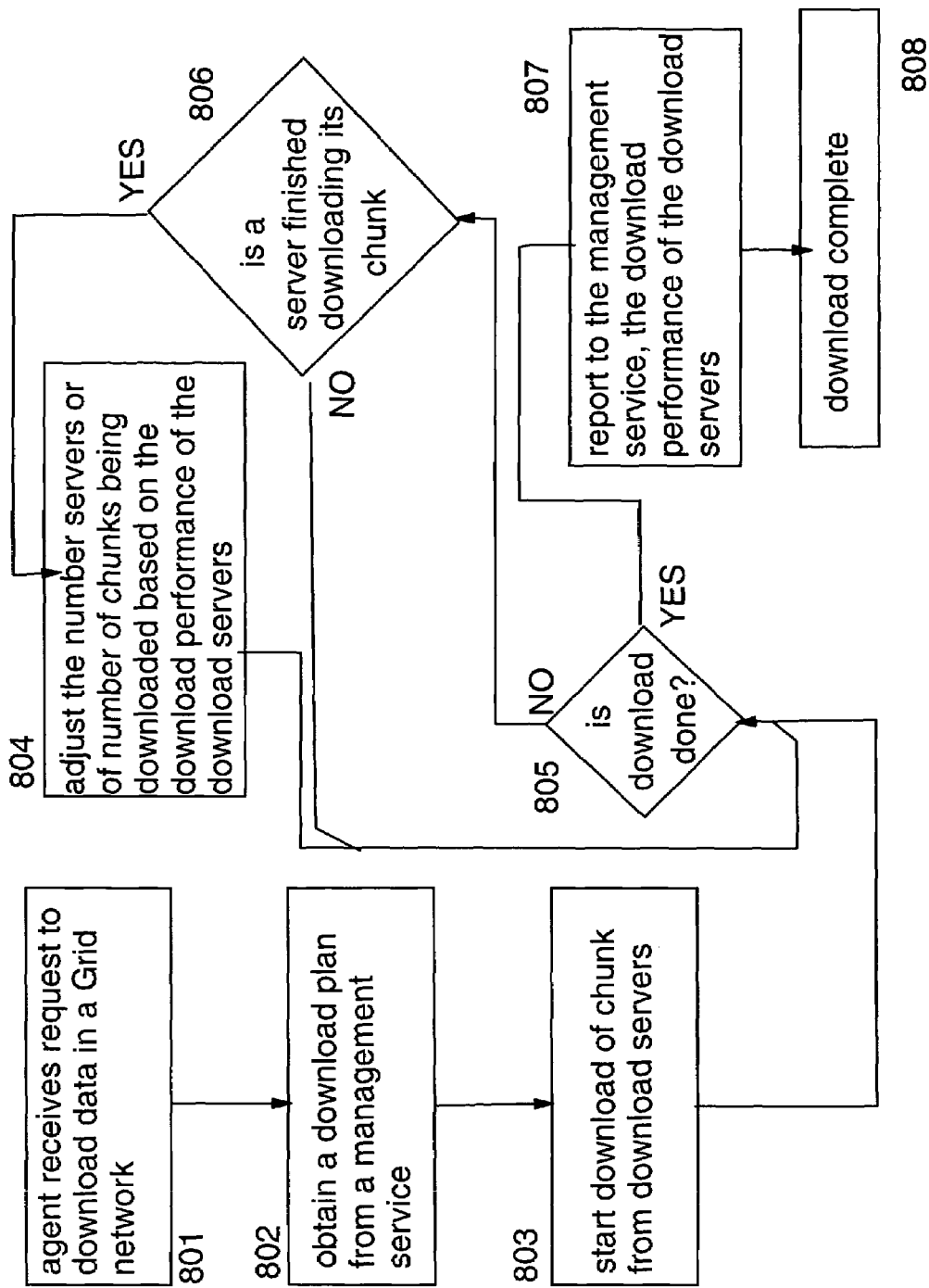
FIG. 8 is a flowchart of downloading content to a Grid download system according to the invention.

The client receives (FIG. 8) 801 a request for download data from an application program. It then requests 802 a download plan from the management service and then contacts the download servers specified in the download plan, then starts 803 a download of a download chunk of download data from each of the two or more download servers contacted. The client monitors 805 806 download performance of the download servers and adjusts 804 the number of download chunks being downloaded based on the download performance of the two or more download servers. It then reports 807 to the management service, the download performance of the two or more download servers.

When the client finishes the download 808, the management service receives new download performance information 907 of the servers from the client. It updates 906 the performance information of the download servers based on the new download performance information.

The management service dynamically performs such activities as choosing the single server for receiving the uploading the file, activating a server of the two or more download servers, deactivating a server of the two or more download servers or updating a server of the two or more download servers.

The management service creates the download plan based on location of the client, the status and usage information of the download servers, QoS requirements, the network proximity of the selected download servers to the client, the geographical proximity of the selected download servers to the client, the outbound bandwidth of the network of a server, the current numbers of chunk downloads supported by the server or the maximum concurrent chunk downloads allowed (where the location of the client agent is determined automatically based on any one of the network address of the client agent or through information provided by the client agent).

Preferably starting a download comprises the following steps:
a. starting a download of a first portion of the download chunk of download data from a first server of the two or more download servers contacted;
b. saving an indication of the download performance of the download chunk portions;
c. starting a download of a new portion of the download chunk of download data from a new server of the two or more download servers contacted;
d. monitoring download performance of the download chunk portions;
e. if the monitored download performance is greater than the saved indication of download performance and the download performance is less than a predetermined maximum performance and all of the two or more download servers contacted have not been started, repeat steps b through e.

The client monitors download performance of download chunk portions of download data from each of download servers started and reassigns a sub-portion of a chunk portion of a first server to a second server where the size of the sub-portion reassigned is any one of proportional to the achieved download performance of the two or more download servers started, proportional to the chunk portion that remains to be downloaded by the first server or substantially half the chunk portion that remains to be downloaded by the first server. The client checks the integrity of the file at the end of the download and sends an indication of the integrity check to the management service.

The client records information of the size of chunks downloaded from each server, the download performance of each server or the identity of the servers that did not respond to the requests, and sends the recorded information to the management service. Preferably a chunk has an associated access control list, and only end users specified on the access control list can download the file. The chunk is stored and distributed in encrypted form. The final decryption of the file is performed by the client agent using the key that it obtains securely from the management service.

Preferably the current download grid system is implemented using Web Services. The download operation is implemented with a proprietary protocol between the client and the server. The management service is implemented using JAVA from SUN MICROSYSTEMS. The repository is a relational database.

Preferably the download grid server is implemented in Java. The server uses the standard TCP/IP protocol and has an algorithm to dynamically adjust the file transfer rate.

Preferably the client is implemented either as a standalone Java application as well as a Web browser-based Java applet.

The security mechanisms preferably uses the Globus 2.2 grid security infrastructure (GSI) implementation to control access. GSI is described in "Grid Security Infrastructure" at www-unix.globusorg/security and in "Overview of the Grid Security Infrastructure" at www-unix.globusorg/security/overviewhtml. The management service has a certificate issued by the Certificate Authority Center (CA) of the existing Grid as discussed in "GSI Key Concepts" at: www-unix.globus.org/toolkit/docs/3.2/gsi/key/index.html. Every download server and client trusts this certificate. X509 proxies are used to delegate the authority of management service to allow client authentication and download directly from download servers. X.509 is described in ITU-T Recommendation X.509 version 3 (1997). "Information Technology—Open Systems Interconnection—The Directory Authentication Framework" ISO/IEC 9594-8:1997.

In a preferred implementation the determination of the optimized plan is calculated based on the geographical distance between the client and the candidate download servers. The IP address of the client and the IP address of the servers is used as the basis for this determination together with a table mapping IP addresses to geographical locations. The optimized plan is encapsulated inside of an X.509 proxy certificate in XML format.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment of the invention has been illustrated and described herein, it is to be understood that the invention is not limited to the precise construction herein disclosed, and the right is "reserved" to all changes and modifications coming within the scope of the invention as defined in the appended claims.

What is claimed is:

1. A computer implemented method in a grid computing infrastructure for optimized data download by incrementally starting parallel downloads of a plurality of chunks of desired download data from a plurality of servers, the method comprising the steps of:
   a. obtaining a download plan from a management service, the download plan comprising an optimized list of a plurality of download servers, having the desired download data, the plurality of download servers deployed in the grid computing infrastructure;
   b. based on the obtained download plan, starting a download of one or more assigned first chunks of the desired download data from a first download server of the plurality of download servers to a client computer of a plurality of client computers, the first download server selected from the optimized list;
   c. during the download of the assigned first chunks, monitoring current download performance of the first download server downloading the desired download data comprising the assigned first chunks;
   d. during the download of the assigned first chunks, responsive to the monitored current download performance of currently downloading desired download data being less than a predetermined maximum performance specified by the obtained download plan, the client computer starting a download of one or more assigned second chunks of the desired download data from a second download server of the plurality of download servers to the client, wherein said download of said assigned second chunks is started while said assigned first chunks are downloading from said first download server; and
   responsive to the monitored current download performance of currently downloading desired download data being greater than the predetermined maximum performance, the client computer starting a download of the one or more assigned second chunks of the desired download data from the first download server of the plurality of download servers to the client; and
   e. reporting to the management service, the monitored current download performance of the plurality of download servers, the monitored current download performance monitored during the download of the assigned first chunks and the assigned second chunks.

2. The method according to claim 1, wherein the steps a through are performed by a client agent at the client computer.

3. The method according to claim 1, wherein the obtaining the download plan further comprises sending a request for the download plan to the management service, the request specifying Quality of Service (QoS) requirements.

4. The method according to claim 3, wherein the QoS requirements include specification of any one of a desired download rate of downloading the desired data or a desired time of completion of downloading the desired data.

5. The method according to claim 1, wherein a chunk of said chunks of desired data consists of a portion of a file further comprising:
   while assigned chunks of the desired download data are downloading, repeating for one additional server at a time the method comprising:
   responsive to the monitored current download performance being less than the predetermined maximum performance and all of the plurality of download servers having not been started, starting a download of assigned additional chunks of the desired download data from an additional download server of the plurality of download servers to the client computer of the plurality of client computers, the additional download server selected from the obtained optimized list; and
   responsive to the monitored current download performance of currently downloading desired download data being greater than the predetermined performance, starting the download of one or more assigned additional chunks of the desired download data from an already started download server.

6. The method according to claim 1, comprising:
   determining a to-be-downloaded first portion of a currently downloading chunk of the desired data, the currently downloading chunk downloading from a corresponding server of the plurality of download servers; and
   starting a parallel download of the to-be-downloaded first portion of the currently downloading chunk from a server other than the corresponding server, wherein the to-be-downloaded first portion is not downloaded from the corresponding server while downloading the first chunk from the corresponding server, wherein size of the to-be-downloaded first portion of the currently downloading, chunk is any one of proportional to the achieved download performance of the plurality of download servers started, proportional to achieved performance of the download of the first portion or proportional to achieved performance of the download of substantially half the first portion.

7. The method according to claim 1, comprising the further steps of:
checking integrity of the desired download data at the end of the download; and
sending an indication of the integrity check to the management service.

8. The method according to claim 1, comprising the further steps of:
recording information of any one of size of assigned chunks downloaded from each of the plurality of servers, download performance of each of the plurality of servers or the identity of each of the plurality of servers that did not respond to requests to download assigned chunks; and
sending the recorded information to the management service.

9. The method according to claim 1, wherein the desired download data has an associated access control list, and only end users specified on the access control list can download the desired download data.

10. The method according to claim 1, wherein the desired download data is stored and distributed in encrypted form such that final decryption of the file is performed by a client agent at the client computer using a key obtained securely from the management service.

11. The method according to claim 1, wherein the desired data is a file and said each of said assigned chunks consist of a portion of the file.

12. The method according to claim 1 further comprising the steps of:
accepting the desired download data from a content provider;
distributing the desired download data to the plurality of download servers of the grid computing infrastructure;
receiving a request from a client for the download plan for downloading the desired download data to the client computer;
responsive to receiving the request for the download plan, creating the download plan, the download plan comprising the list of the plurality of download servers having the desired download data and further comprising performance information of the plurality of download servers;
sending the created download plan to the client;
then receiving new download performance information of the plurality of download servers, the new download performance comprising the monitored current performance of the plurality of download servers; and
updating the performance information of the download servers based on the new download performance information.

13. A computer program product for optimized data download by incrementally starting parallel downloads of a plurality of chunks of desired download data from a plurality of servers in a grid computing infrastructure, the computer program product comprising a storage medium readable by a processing circuit and storing instructions for performing a method comprising:
a. obtaining a download plan from a management service, the download plan comprising an optimized list of a plurality of download servers, having a the desired download data, the plurality of download servers deployed in the grid computing infrastructure;
b. based on the obtained download plan, starting a download of one or more assigned first chunks of the desired download data from a first download server of the plurality of download servers to a client computer of a plurality of client computers, the first download server selected from the optimized list;
c. during the download of the assigned first chunks, monitoring current download performance of the first download server downloading the desired download data comprising the assigned first chunks;
d. during the download of the assigned first chunks:
responsive to the monitored current download performance of currently downloading desired download data being less than a predetermined maximum performance specified by the obtained download plan, the client computer starting a download of one or more assigned second chunks of the desired download data from a second download server of the plurality of download servers to the client, wherein said download of said assigned second chunks is started while said assigned first chunks are downloading from said first download server; and
responsive to the monitored current download performance of currently downloading desired download data being greater than the predetermined maximum performance, the client computer starting a download of the one or more assigned second chunks of the desired download data from the first download server of the plurality of download servers to the client; and
e. reporting to the management service, the monitored current download performance of the plurality of download servers, the monitored current download performance monitored during the download of the assigned first chunks and the assigned second chunks.

14. The computer program product according to claim 13, wherein the steps a through e are performed by a client agent at the client computer.

15. The computer program product according to claim 13, wherein the obtaining the download plan further comprises sending a request for the download plan to the management service, the request specifying Quality of Service (QoS) requirements.

16. The computer program product according to claim 15, wherein the QoS requirements include specification of any one of a desired download rate of downloading the desired data or a desired time of completion of downloading the desired data.

17. The computer program product according to claim 13, wherein a chunk of said chunks of desired data consists of a portion of a file further comprising:
while assigned chunks of the desired download data are downloading, repeating for one additional server at a time the computer program product comprising:
responsive to the monitored current download performance being less than the predetermined maximum performance and all of the plurality of download servers having not been started, starting a download of assigned additional chunks of the desired download data from an additional download server of the plurality of download servers to the client computer of the plurality of client computers, the additional download server selected from the obtained optimized list; and
responsive to the monitored current download performance of currently downloading desired download data being greater than the predetermined performance, starting the download of one or more assigned additional chunks of the desired download data from an already started download server.

18. The computer program product according to claim 13, comprising:

determining a to-be-downloaded first portion of a currently downloading chunk of the desired data, the currently downloading chunk downloading from a corresponding server of the plurality of download servers; and starting a parallel download of the to-be-downloaded first portion of the currently downloading chunk from a server other than the corresponding server, wherein the to-be-downloaded first portion is not downloaded from the corresponding server while downloading the first chunk from the corresponding server, wherein size of the to-be-downloaded first portion of the currently downloading chunk is any one of proportional to the achieved download performance of the plurality of download servers started, proportional to achieved performance of the download of the first portion or proportional to achieved performance of the download of substantially half the first portion.

19. The computer program product according to claim 13, comprising the further steps of:

checking integrity of the desired download data at the end of the download; and sending an indication of the integrity check to the management service.

20. The computer program product according to claim 13, comprising the further steps of:

recording information of any one of size of assigned chunks downloaded from each of the plurality of servers, download performance of each of the plurality of servers or the identity of each of the plurality of servers that did not respond to requests to download assigned chunks; and sending the recorded information to the management service.

21. The computer program product according to claim 13, wherein the desired download data has an associated access control list, and only end users specified on the access control list can download the desired download data.

22. The computer program product according to claim 13, wherein the desired download data is stored and distributed in encrypted form such that final decryption of the file is performed by a client agent at the client computer using a key obtained securely from the management service.

23. The computer program product according to claim 13, wherein the desired data is a file and said each of said assigned chunks consist of a portion of the file.

24. The computer program product according to claim 13, further comprising the steps of:

accepting the desired download data from a content provider; distributing the desired download data to the plurality of download servers of the grid computing infrastructure;

receiving a request from a client for the download plan for downloading the desired download data to the client computer;

responsive to receiving the request for the download plan, creating the download plan, the download plan comprising the list of the plurality of download servers having the desired download data and further comprising performance information of the plurality of download servers;

sending the created download plan to the client;

then receiving new download performance information of the plurality of download servers, the new download performance comprising the monitored current performance of the plurality of download servers; and updating the performance information of the download servers based on the new download performance information.

25. The computer program product according to claim 13, wherein while assigned chunks of the desired download data are downloading from the plurality of download servers, the computer program product comprising:

1. prior to starting a download of assigned chunks of the desired download data from a server other than the first server, saving the monitored current download performance as a saved monitored download performance value;

2. responsive to the saved monitored download performance value being less than the predetermined maximum performance and the saved monitored download performance value being less than the monitored current download performance, starting a download of second assigned chunks of the desired download data from an additional download server of the plurality of download servers; and 3. responsive to any one of the saved monitored download performance value being greater than the predetermined maximum performance or the saved monitored download performance value being greater than the monitored current download performance, not starting a download of assigned chunks of the desired download data from an additional download server of the plurality of download servers.

26. The computer program product according to claim 25, comprising:

repeating step 2 one or more times; and during the download of assigned chunks, adjusting the number of assigned chunks of the desired download data being downloaded by any one of the download servers of the plurality of download servers.

27. A computer system in a grid computing infrastructure for optimized data download by incrementally starting parallel downloads of a plurality of chunks of desired download data from a plurality of servers, the computer system comprising:

a processor in communication with a network, wherein the processor is capable of performing a method comprising:

a. obtaining a download plan from a management service, the download plan comprising an optimized list of a plurality of download servers, having a the desired download data, the plurality of download servers deployed in the grid computing infrastructure;

b. based on the obtained download plan, starting a download of one or more assigned first chunks of the desired download data from a first download server of the plurality of download servers to a client computer of a plurality of client computers, the first download server selected from the optimized list;

c. during the download of the assigned first chunks, monitoring current download performance of the first download server downloading the desired download data comprising the assigned first chunks;

d. during the download of the assigned first chunks:

responsive to the monitored current download performance of currently downloading desired download data being less than a predetermined maximum performance specified by the obtained download plan, the client computer starting a download of one or more assigned second chunks of the desired download data from a second download server of the plurality of download servers to the client, wherein said download of said assigned second chunks is started while said assigned first chunks are downloading from said first download server; and responsive to the monitored current download performance of currently downloading desired download data being greater than the predetermined maximum performance, the client computer starting a download of the one or more assigned second chunks of the desired download data from the first download server of the plurality of download servers to the client; and e. reporting to the management service, the monitored current download performance of the plurality of download servers, the monitored current download performance monitored during the download of the assigned first chunks and the assigned second chunks.

28. The computer system according to claim 27, wherein the steps a through e are performed by a client agent at the client computer.

29. The computer system according to claim 27, wherein the obtaining the download plan further comprises sending a request for the download plan to the management service, the request specifying Quality of Service (QoS) requirements.

30. The computer system according to claim 29, wherein the QoS requirements include specification of any one of a desired download rate of downloading the desired data or a desired time of completion of downloading the desired data.

31. The computer system according to claim 27, wherein a chunk of said chunks of desired data consists of a portion of a file further comprising:

while assigned chunks of the desired download data are downloading, repeating for one additional server at a time the computer system comprising:

responsive to the monitored current download performance being less than the predetermined maximum performance and allot the plurality of download servers having not been started, starting a download of assigned additional chunks of the desired download data from an additional download server of the plurality of download servers to the client computer of the plurality of client computers, the additional download server selected from the obtained optimized list; and responsive to the monitored current download performance of currently downloading desired download data being greater than the predetermined performance, starting the download of one or more assigned additional chunks of the desired download data from an already started download server.

32. The computer system according to claim 27, comprising:

determining a to-be-downloaded first portion of a currently downloading chunk of the desired data, the currently downloading chunk downloading from a corresponding server of the plurality of download servers; and starting a parallel download of the to-be-downloaded first portion of the currently downloading chunk from a server other than the corresponding server, wherein the to-be-downloaded first portion is not downloaded from the corresponding server while downloading the first chunk from the corresponding server, wherein size of the to-be-downloaded first portion of the currently downloading chunk is any one of proportional to the achieved download performance of the plurality of download servers started, proportional to achieved performance of the download of the first portion or proportional to achieved performance of the download of substantially half the first portion.

33. The computer system according to claim 27, comprising the further steps of:

checking integrity of the desired download data at the end of the download; and sending an indication of the integrity check to the management service.

34. The computer system according to claim 27, comprising the further steps of:

recording information of any one of size of assigned chunks downloaded from each of the plurality of servers, download performance of each of the plurality of servers or the identity of each of the plurality of servers that did not respond to requests to download assigned chunks; and sending the recorded information to the management service.

35. The computer system according to claim 27, wherein the desired download data has an associated access control list, and only end users specified on the access control list can download the desired download data.

36. The computer system according to claim 27, wherein the desired download data is stored and distributed in encrypted form such that final decryption of the file is performed by a client agent at the client computer using a key obtained securely from the management service.

37. The computer system according to claim 27, wherein the desired data is a file and said each of said assigned chunks consist of a portion of the file.

38. The computer system according to claim 27 further comprising the steps of:

accepting the desired download data from a content provider; distributing the desired download data to the plurality of download servers of the grid computing infrastructure;

receiving a request from a client for the download plan for downloading the desired download data to the client computer;

responsive to receiving the request for the download plan, creating the download plan, the download plan comprising the list of the plurality of download servers having the desired download data and further comprising performance information of the plurality of download servers;

sending the created download plan to the client;

then receiving new download performance information of the plurality of download servers, the new download performance comprising the monitored current performance of the plurality of download servers; and updating the performance information of the download servers based on the new download performance information.

39. The computer system according to claim 27, wherein while assigned chunks of the desired download data are downloading from the plurality of download servers, the computer system comprising:

1. prior to starting a download of assigned chunks of the desired download data from a server other than the first server, saving the monitored current download performance as a saved monitored download performance value;

2. responsive to the saved monitored download performance value being less than the predetermined maximum performance and the saved monitored download performance value being less than the monitored current download performance, starting a download of second assigned chunks of the desired download data from an additional download server of the plurality of download servers; and 3. responsive to any one of the saved monitored download performance value being greater than the predetermined maximum performance or the saved monitored download performance value being greater than the monitored current download performance, not starting a download of assigned chunks of the desired download data from an additional download server of the plurality of download servers.

40. The computer system according to claim 39, comprising: repeating step 2 one or more times; and during the download of assigned chunks, adjusting the number of assigned chunks of the desired download data being downloaded by any one of the download servers of the plurality of download servers.

* * * * *

UNITED STATES PATENT AND TRADEMARK OFFICE
CERTIFICATE OF CORRECTION

PATENT NO.       : 7,631,098 B2
APPLICATION NO. : 10/862977
DATED            : December 8, 2009
INVENTOR(S)      : Boutboul et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1106 days.

Signed and Sealed this

Second Day of November, 2010

David J. Kappos
*Director of the United States Patent and Trademark Office*